Feb. 12, 1929.
G. H. TRAUT
DIRECTION INDICATOR FOR MOTOR VEHICLES
Filed May 3, 1927
1,701,738
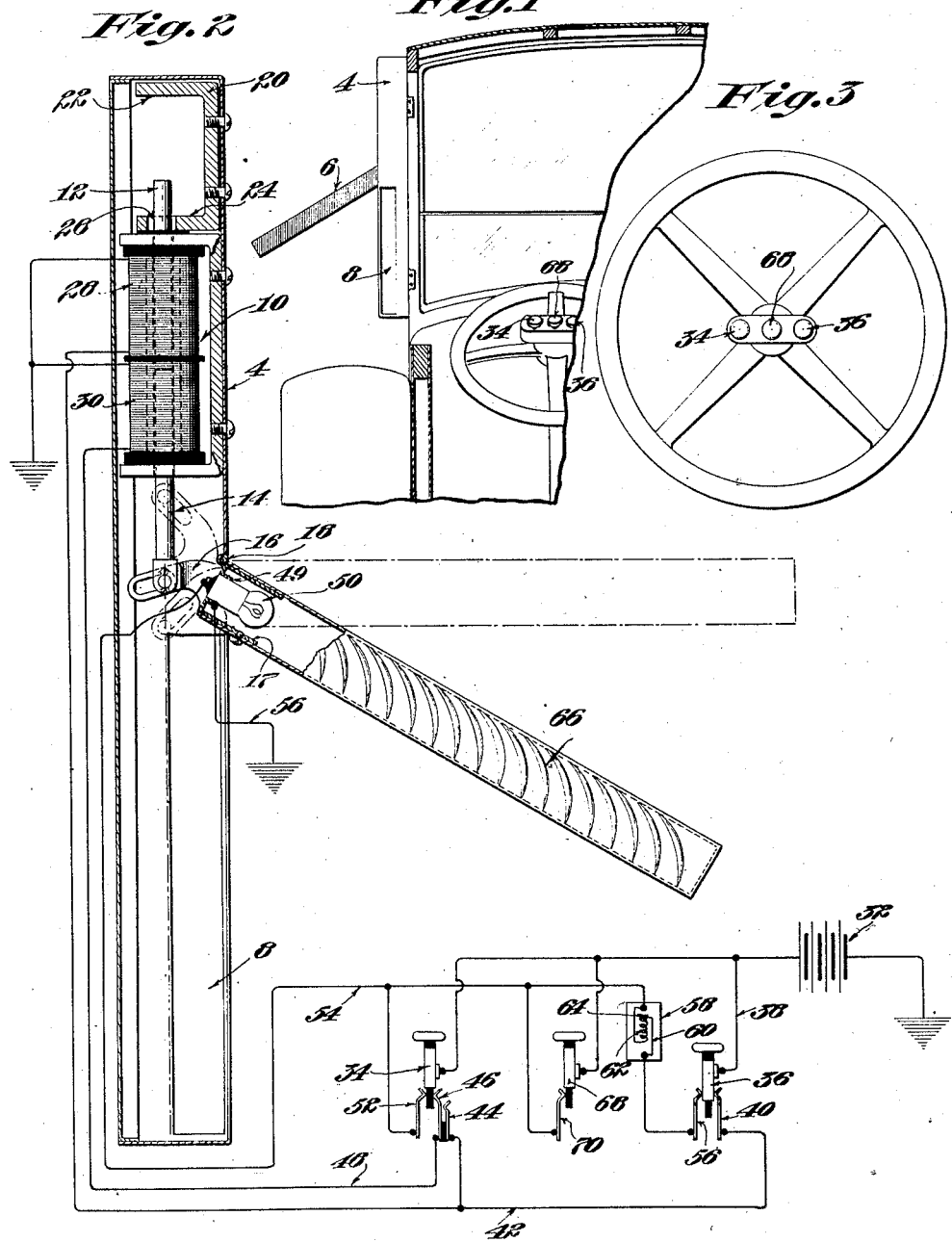

Patented Feb. 12, 1929.

1,701,738

UNITED STATES PATENT OFFICE.

GEORG H. TRAUT, OF SHARON, MASSACHUSETTS.

DIRECTION INDICATOR FOR MOTOR VEHICLES.

Application filed May 3, 1927. Serial No. 188,476.

The present invention relates to direction indicators for motor vehicles.

The principal object of the present invention is to provide a simple and inexpensive direction signal which is under convenient control of the driver and which will be clearly visible in any degree of light to show the intended direction of movement, both to those in front and those in the rear of the vehicle.

A further object of the invention is to provide an indicator which will simulate the usually accepted hand signals in order that no special code may be necessary to indicate the intended operation of the vehicle.

With these and other objects in view as will hereinafter appear, the present invention consists in the direction indicator hereinafter described and particularly defined in the claims.

In the accompanying drawings illustrating the preferred form of the invention, Fig. 1 is a sectional view of a motor vehicle looking toward the front thereof with the direction indicator mounted thereon; Fig. 2 is a vertical sectional elevation looking from the front, together with a diagram of the electrical circuit connections; and Fig. 3 is a view of the steering wheel showing the manually operated controls.

The illustrated embodiment of the invention comprises a casing 4 which is adapted to be attached to the left-hand side of the wind shield frame as indicated in Fig. 1. A semaphore 6 which is normally retained in a vertical position in the casing, is adapted to be moved either to a horizontal or an inclined position to indicate respectively a left-hand or a right-hand turn. The semaphore is illuminated from within in order that the signal may be visible by daylight or at night in either position to which it is moved. The signal may also be illuminated when the semaphore is in its vertical position in order to show a straight ahead signal which is of value not only to those approaching from the rear, but particularly to a traffic officer in front of the vehicle in indicating its contemplated operation. For this purpose, the casing is provided in the front and rear sides with openings 8 in order that the illuminated semaphore may be visible therethrough.

The means for operating the semaphore comprises an electro magnet indicated at 10, together with a magnetic core 12 which is received within and movable axially of the coil. The magnetic core 12 is connected by a rod 14 of non-magnetic material with a link 16 attached to the semaphore. The semaphore is attached to a frame 17 which is pivoted on a pintle 18 in the casing. The semaphore is normally retained in vertical position by a permanent magnet 20 which is attached to the upper part of the casing and against which the end of the core 12 contacts when it is in its uppermost position. The magnet is formed in the shape of a yoke having an upper portion 22 with which the core 12 is adapted to engage and a lower portion 24 having an enlarged opening 26 through which the core is free to pass. When the device is in non-indicating position, the core forms a keeper which conserves the magnetism of the permanent magnet. The electro magnet 10 is constructed with two windings, namely, an upper winding 28 and a lower winding 30. Upon energization of the upper winding alone, the core is moved to the position indicated in full lines in Fig. 2, thereby moving the semaphore to its inclined position as indicated in full lines, and when both windings 28 and 30 are energized, the core is attracted farther into the magnet and raises the semaphore to the horizontal position indicated in dot and dash lines.

The windings 28 and 30 are selectively energized from the usual battery 32 by means of two switches 34 and 36, the former controlling the movement of the semaphore to its horizontal position to indicate a left turn, and the latter controlling the movement of the semaphore to its inclined position for indicating a right turn. In either case, the direction of current is such as to magnetize the core 12 with its upper end of the same polarity as that of the upper part 22 of the permanent magnet, in order that the core will be initially repelled from the permanent magnet. Although the latter is of sufficient strength to retain the core in its uppermost position against the shocks to which the vehicle is necessarily subjected, the feature of initially repelling the core therefrom insures immediate lifting of the semaphore without any possibility of sticking when one or both of the coils are energized. When the switch 36 is closed, a circuit is completed from the battery through a conductor 38, the plug of the switch 36, a contact 40, and a conductor 42, to the coil 28, and thence to ground. When the switch 34 is depressed, the circuit is likewise closed through the coil 28 by a conductor extending from the battery through the switch 34, contact 44, and conductor 42, and an additional circuit is completed through the winding 30 by virtue of the connection of the plug of the switch with a contact 46 which connects with the winding 30 through a wire 48. Actuation of the switch 34 therefore causes the semaphore to be raised to horizontal position by energizing both windings of the magnet, while the switch 36 controls the indication for a right turn by the energization of one winding only of the coil.

In order that the signal may be visible under all light conditions, the semaphore is made hollow and is constructed of a light transmitting material, preferably a translucent material such as frosted celluloid. A transparent semaphore may be employed, but a translucent member is conducive to a more uniform illumination throughout its length. The semaphore frame carries a socket 49 in which is received an electric lamp 50 which illuminates the semaphore when its circuit is closed. Electrical circuits controlled by the switches 34 and 36 serve to light the lamp simultaneously with the movement of the semaphore. Thus the contact 52 which is engaged by the plug of the switch 34 when the latter is depressed, connects by the conductor 54 with one side of the lamp, the other side of which is grounded as indicated by the connection 56. This operation of the switch gives a continuous illumination of the semaphore when the latter is raised to its horizontal position to indicate a left turn. For a right turn, the lamp is operated in a manner to give a signal which simulates the usual rotary movement of the hand according to the accepted code of hand signals now in use by motorists. To this end, a contact 56 of the switch 36 connects with the conductor 54 through a device 58 which periodically opens and closes the lamp circuit. The device 58 comprises a bimetallic thermostat member 60 which is heated by the passage of current through a coil 62 and which is arranged to engage normally with a fixed contact 64. The arrangement is such that with the establishment of a current through the coil 62, the bimetallic member becomes heated and moves away from the contact 64, thus breaking the circuit and permitting the thermostatic member to cool and again approach the contact 64 to close the circuit. The result is that the lamp is caused to flicker at a frequency of several times per second. The semaphore is provided with corrugated side walls as indicated at 66, which, in combination with the flickering of the lamp, produce a striking imitation of a rotary movement such as is ordinarily given by hand according to the generally accepted code of hand signals.

In order to indicate to a traffic officer in front of a vehicle, as well as to those behind when a straight ahead movement is contemplated, provision is made for lighting the lamp 50 with the semaphore retained in vertical position, the illuminated semaphore being then visible through the openings 8 of the casing. To this end, a switch 68 having a contact 70 connected with the conductor 54 is arranged to close the lamp circuit without energization of the magnet.

The switches may be located on the steering wheel in a position conveniently accessible to the driver, as shown in Fig. 3. The switches are herein illustrated as being of the familiar jack type, which type is advantageous in that the switch, after being depressed, is maintained closed until manually pulled by the driver, thus causing the proper signal to be continuously displayed without further attention, until the driver is in a position to open the circuit conveniently. If desired, however, the switches may be of push button form, permitting the circuit to be opened immediately upon release of pressure.

Having thus described the invention, what is claimed is:

1. A direction indicator for motor vehicles, comprising a semaphore, an electromagnet, a movable member of magnetic material associated with the electromagnet, connections between the movable member and the semaphore for moving the latter when the movable member is attracted by the electromagnet, a permanent magnet normally engaging the movable member to hold the semaphore in non-indicating position, and means for energizing the electromagnet to attract the movable member and to magnetize it with such polarity as to cause it to be repelled from the permanent magnet.

2. A direction indicator for motor vehicles comprising a semaphore, a coil, a magnet core adapted to be drawn into the coil when the latter is energized, connections between the core and the semaphore, a permanent magnet normally engaging the core to retain the semaphore in non-indicating position, and means for energizing the coil to move the core and to magnetize the core with the same polarity as the permanent magnet whereby the core is initially repelled by the permanent magnet.

In testimony whereof I have signed my name to this specification.

GEORG H. TRAUT.